US012333878B2

(12) United States Patent
Lee

(10) Patent No.: US 12,333,878 B2
(45) Date of Patent: Jun. 17, 2025

(54) METHOD FOR SETTING LINKING BY MEANS OF DOOR LOCK ADMINISTRATOR RIGHT

(71) Applicant: EPIC SYSTEMS CO., LTD., Ansan-si (KR)

(72) Inventor: Wan Seob Lee, Ansan-si (KR)

(73) Assignee: EPIC SYSTEMS CO., LTD., Ansan-si (KR)

( * ) Notice: Subject to any disclaimer, the term of this patent is extended or adjusted under 35 U.S.C. 154(b) by 0 days.

(21) Appl. No.: 18/562,455

(22) PCT Filed: Jan. 20, 2022

(86) PCT No.: PCT/KR2022/001016
§ 371 (c)(1),
(2) Date: Nov. 20, 2023

(87) PCT Pub. No.: WO2023/140398
PCT Pub. Date: Jul. 27, 2023

(65) Prior Publication Data
US 2024/0242552 A1 Jul. 18, 2024

(51) Int. Cl.
*G07C 9/00* (2020.01)
*G07C 9/33* (2020.01)

(52) U.S. Cl.
CPC ........... *G07C 9/00817* (2013.01); *G07C 9/33* (2020.01); *G07C 2009/00396* (2013.01); *G07C 2009/0042* (2013.01); *G07C 2009/00841* (2013.01)

(58) Field of Classification Search
CPC .................. G07C 9/00817; G07C 9/33; G07C 2009/00396; G07C 2009/0042; G07C 2009/00841; G07C 9/00571; G07C 2009/00769; G07C 2009/00825
See application file for complete search history.

(56) References Cited

U.S. PATENT DOCUMENTS

| | | | | |
|---|---|---|---|---|
| 9,390,572 | B2 | 7/2016 | Almomani | |
| 2017/0132861 | A1* | 5/2017 | Ho | G07C 9/00896 |
| 2020/0327758 | A1* | 10/2020 | Ma | G07C 9/00571 |
| 2020/0364588 | A1* | 11/2020 | Knox | G06V 40/20 |
| 2021/0040772 | A1* | 2/2021 | Kim | G06Q 30/02 |
| 2022/0028199 | A1 | 1/2022 | Jang | |

FOREIGN PATENT DOCUMENTS

| | | | |
|---|---|---|---|
| KR | 10-2017-0010991 | A | 2/2017 |
| KR | 10-2017-0116888 | A | 10/2017 |
| KR | 10-1956344 | B1 | 3/2019 |
| KR | 10-1954449 | B1 | 5/2019 |
| KR | 10-2239274 | B1 | 4/2021 |

* cited by examiner

*Primary Examiner* — Sisay Yacob
(74) *Attorney, Agent, or Firm* — You & IP, LLC

(57) ABSTRACT

The present invention relates to a method for setting linking by means of a door lock administrator right, and the objective of the present invention is to set linking such as that of password resetting of a door lock only through a smart device having acquired a door lock administrator right through administrator password setting.

7 Claims, 4 Drawing Sheets

METHOD FOR SETTING LINKING BY MEANS OF DOOR LOCK ADMINISTRATOR RIGHT

TECHNICAL FIELD

The present invention relates to a method of setting a digital door lock, and more specifically, to a setting method in conjunction with a door lock administrator authority, which allows only an administrator authority to perform pairing on the door lock and a door lock management app (application).

BACKGROUND ART

With the development of communication and security technology, password authentication methods for unlocking/locking digital door locks, which are access control devices, are becoming more advanced day by day.

For example, in addition to the traditional method of remembering a preset password and inputting the password, various access security systems are being developed, including a method of adding a one-time password (OTP) authenticator to require a new password to be input every time a user enters or exits, a method of unlocking or locking a door lock using a wireless communication terminal such as near-field communication (NFC), Bluetooth, Wi-Fi, etc., and the like.

A technique in which such a digital door lock system is used to improve security through real-time communication between a mobile terminal such as a smartphone and a server and password generation and changes is disclosed in Korean Laid-Open Patent Application No. 10-2017-0116888.

FIG. 1 is a schematic configuration diagram of a digital door lock system according to the related art, and a digital door lock system 100 is composed of a mobile terminal 110, a management server 120, and a door lock 130.

The mobile terminal 110 is a wireless terminal equipped with a wireless Internet communication function such as the third generation of wireless mobile telecommunication (3G), the fourth generation of wireless mobile telecommunication (4G, long-term evolution (LTE)), Wi-Fi, or the like and a short-range wireless communication function such as Bluetooth Low Energy (BLE), iBeacon, radio-frequency identification (RFID), or the like, and the mobile terminal 110 may receive a user codebook including a plurality of passwords with different pieces of coordinate information from the management server 120 through user authentication, and transmit a password according to the coordinate information requested by the door lock 130 to the door lock 130 using the user codebook.

User authentication is performed by the management server 120 to register information on a door lock of a reserved room in the mobile terminal 110 when a user makes a reservation for accommodation through a dedicated app (application) on the mobile terminal 110, and when the user authentication is completed, the user codebook is transmitted from the management server 120 to the mobile terminal 110.

A codebook may include a plurality of different passwords, and each password may have one of different pieces of coordinate information. For example, when coordinate values range from 00 to 99, different password values are assigned to the respective coordinate values, and thus the codebook may include 100 different passwords.

Here, the number of passwords stored in one codebook is not limited, and a size of the codebook may be adjusted according to a security level.

The door lock 130 may request a plurality of passwords assigned to arbitrary coordinates of a pre-stored administrator codebook simultaneously from the mobile terminal 110, and control opening or closing of a door in response to a password response received from the mobile terminal 110.

In this way, according to the related art, a digital door lock system with enhanced security through real-time communication between a door lock, a mobile terminal, and a server, and password generation and changes can be provided.

However, the user codebook and the administrator codebook according to the related art are not only somewhat weak in terms of security due to the risk of hacking, but are also vulnerable to acquiring an administrator authority, and thus there is a risk that anyone can arbitrarily change the password.

DISCLOSURE

Technical Problem

The present invention is directed to solving the problems in the related art and providing a setting method in conjunction with a door lock administrator authority, which sets linking such as password resetting of the door lock or the like only through a smart device that has acquired a door lock administrator authority through administrator password setting.

Technical Solution

One aspect of the present invention provides a setting method in conjunction with a door lock administrator authority, which manages a door lock through a door lock management app of a smart device linked to a server, including a first process of downloading and installing a door lock management app on the smart device through the server; a second process of performing pairing on the door lock retrieved through a wireless communication method through the door lock management app; a third process of activating an administrator authority by inputting an administrator password in response to a request for inputting a password of the door lock; and a fourth process of performing pairing on the door lock management app and the door lock with the administrator authority.

Here, the door lock may perform wireless data transmission and pairing with the smart device through a built-in wireless communication module, and a password may be reset and door opening/closing control data may be generated by the administrator authority through a built-in door lock control module according to data received from the smart device through the wireless communication module.

In the third process, the door lock administrator authority may be an authority of an administrator registered with an identification (ID) and a password on the server, the administrator authority may be acquired only by inputting a preset administrator password in response to a request for inputting the administrator password of the door lock after logging in as a user registered on the server, and an initial administrator password may be generated using a set password of the door lock.

The set password may be a password assigned when a door lock product is released, or a password reset by a user using the password assigned when the door lock product is released, the administrator password may be a password generated only once for a first time using the set password, and the generated initial administrator password may be changed or deleted later only by the administrator's settings, and the server and the door lock are linked only through the administrator password.

Advantageous Effects

According to a setting method in conjunction with the door lock administrator authority according to the present invention, it is possible to grant an administrator authority only with an administrator password and set a linked door lock only through a door lock management app that has received the administrator authority, and thus it is possible to prevent anyone other than the administrator from setting a linked door lock password or the like to improve door lock management security.

MODES OF THE INVENTION

Figure 1:
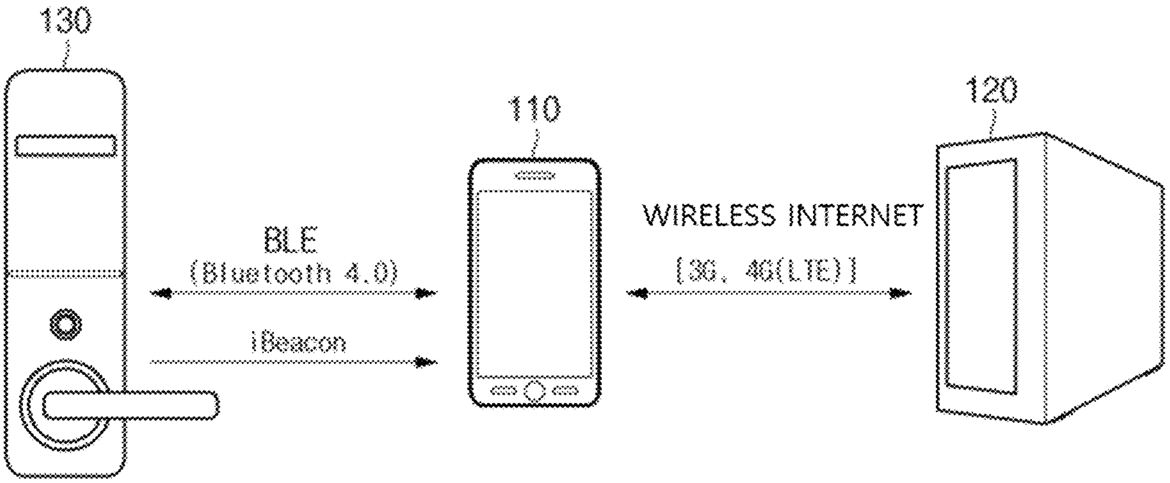
FIG. 1 is a schematic configuration diagram of a digital door lock system according to the related art.

The above-described features and effects of the present invention will be clearly understood through the following detailed description taken in conjunction with the accompanying drawings, and accordingly, the technical idea of the present invention can be easily implemented by those skilled in the art.

While the present invention may have various modifications and alternative forms, specific embodiments thereof are shown by way of example in the drawings and will be described herein in detail.

However, it should be understood that there is no intent to limit the present invention to the particular forms disclosed, and on the contrary, the present invention is to cover all modifications, equivalents, and alternatives falling within the spirit and scope of the present invention.

The terminology used herein is for the purpose of describing specific embodiments only and is not intended to limit the present invention.

Figure 2:
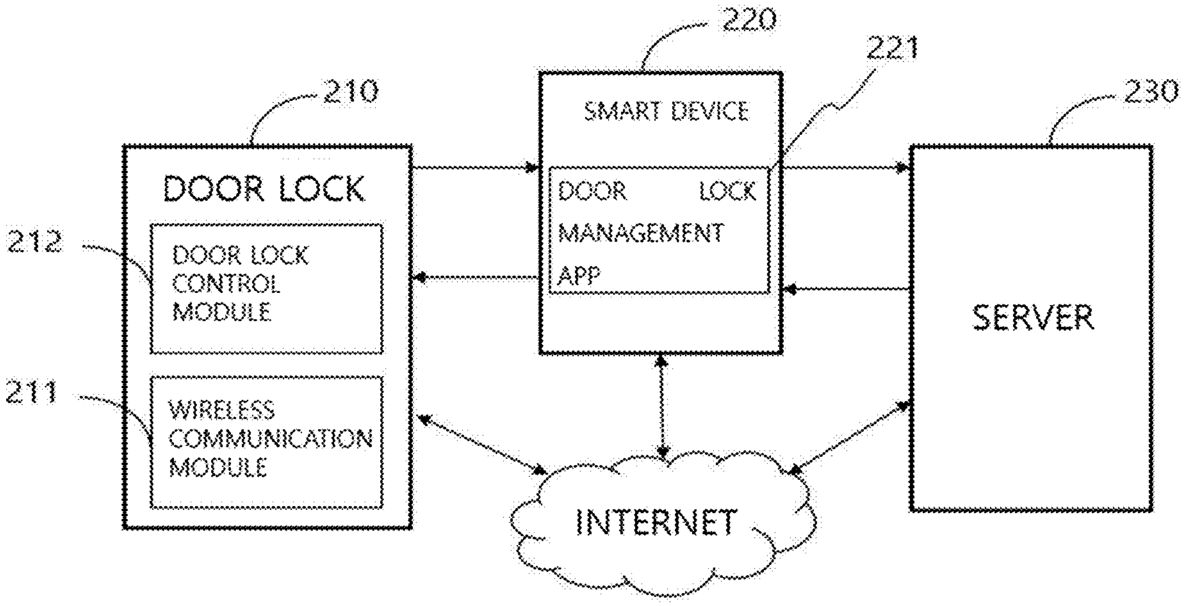
FIG. 2 is a schematic configuration diagram of a door lock system for implementing the present invention.

FIG. 2 is a schematic diagram of a door lock system for setting in conjunction with a door lock administrator authority according to an exemplary embodiment of the present invention, and the door lock system is composed of a digital door lock 210 that can be unlocked or locked with a password input through wireless communication, a smart device 220 on which a door lock management app is installed and which uses the door lock management app to manage linkage setting such as password resetting for the door lock 210 with an administrator authority, and a server 230 for providing the door lock management app to the smart device 220 and registering and providing the door lock management app when resetting the password.

Here, the door lock 210 includes a wireless communication module 211 for performing wireless data transmission and pairing with the smart device 220 when used in an Internet of things (IoT) use mode, and a door lock control module 212 for resetting a password or generating door opening/closing control data by the administrator authority according to data received from the smart device 220 through the wireless communication module 211.

The wireless communication module 211 is a communication module that can be used not only in a smartphone capable of communicating at a short or long distance such as wireless Internet (e.g., Wi-Fi), Bluetooth, and near-field communication (NFC), but also in an environment where communication in an IoT use mode is possible over a long distance such as a cloud, and when wireless Internet is used, the wireless communication module 211 may monitor a state of the door lock 210 or turn the door lock 210 on/off with a smart device through a gateway installed in the home even from outside.

A setting method in conjunction with a door lock administrator authority using the door lock system configured as described above will be described in detail with reference to FIGS. 3 and 4 as follows.

Figure 3:
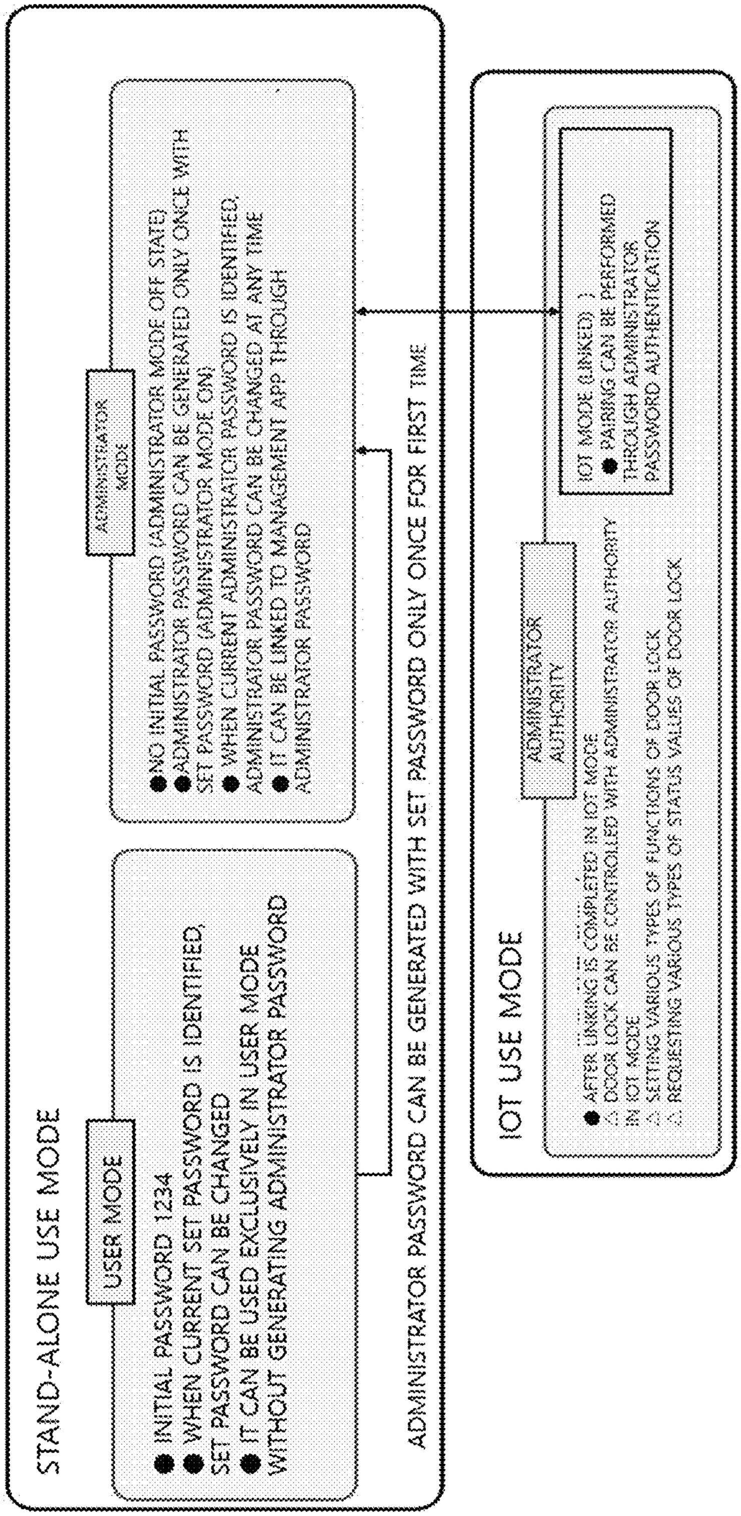
FIG. 3 is a diagram for describing operation of a door lock according to an embodiment of the present invention in a stand-alone use mode or an Internet of things (IoT) use mode.

First, referring to FIG. 3, the door lock system according to the embodiment of the present invention may be selectively used in a stand-alone use mode or an IoT use mode.

In the case of the stand-alone use mode, an initial password is usually a set password "1234" assigned during the manufacturing process, and may be used to change to a new set password at any time.

In this case, it is possible to operate the door lock system exclusively in a user mode even without generating an administrator password.

When the door lock system is used in an administrator mode, an administrator password is generated using the above set password, and this process is limited to being performed only once for the first time.

In the administrator mode, it is possible to change to a new administrator password using the generated administrator password at any time, and it is possible to link with a door lock management app 221 of the smart device 220, which will be described below, through the administrator password.

Figure 4:
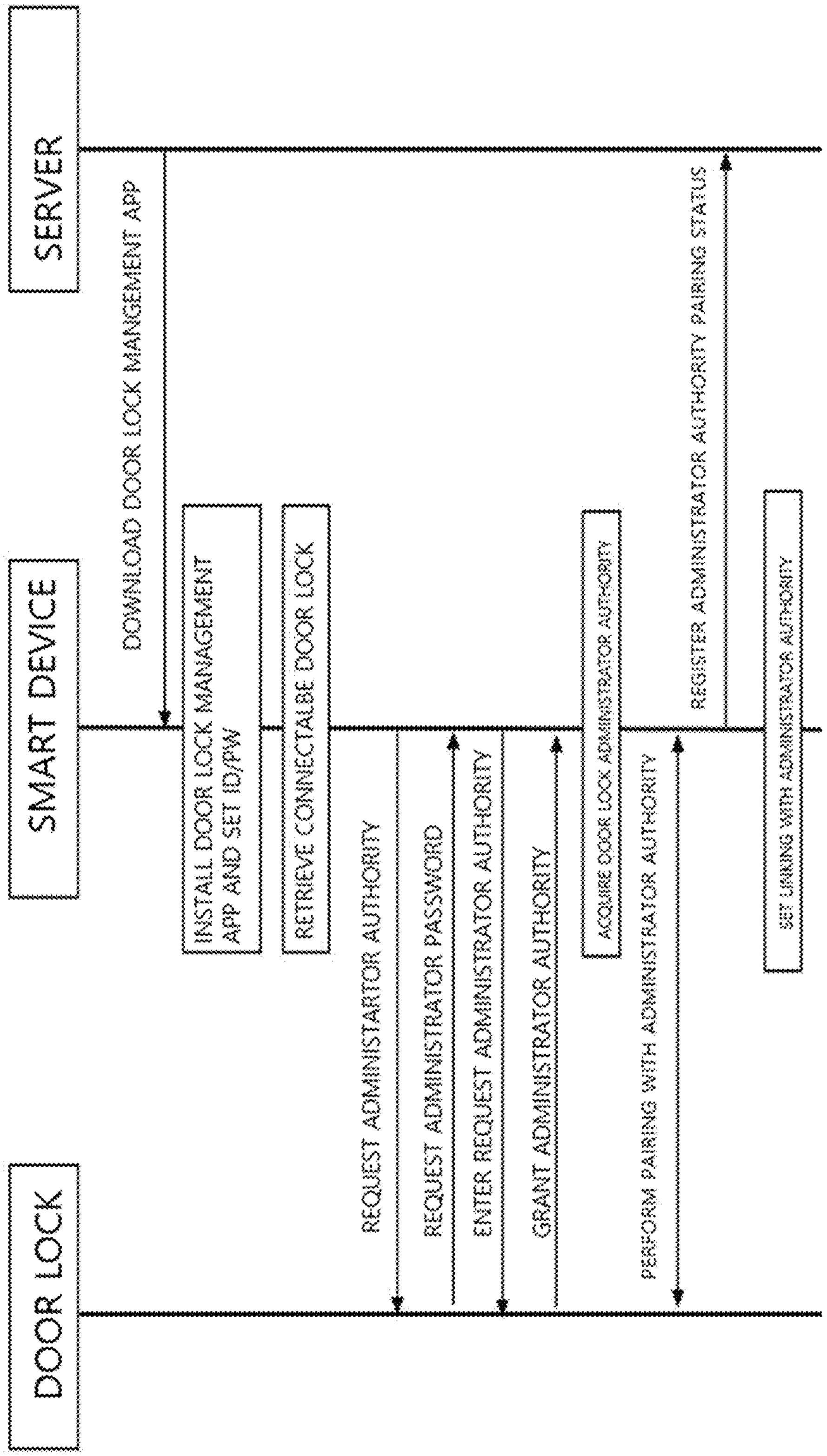
FIG. 4 is a flowchart of a setting method in conjunction with a door lock administrator authority according to an embodiment of the present invention.

Referring to FIG. 4, a process of granting and setting an administrator authority using the door lock management app 221 of the smart device 220, and the IoT use mode will be described in detail as follows.

The smart device 220 is connected to the server 230 and downloads and installs the door lock management app 221.

The door lock management app 221 sets an identification (ID) and a password and logs in.

The smart device 220 retrieves a door lock 210 that can be connected wirelessly through the door lock management app 221, generates an administrator password by inputting the set password set for the retrieved door lock 210, and is connected to the door lock management app 221 through the generated administrator password.

Here, the set password is an initial password assigned during the manufacturing process or a password set by the user using the initial password, the administrator password is a password generated only once for the first time using the set password, the generated initial administrator password may be changed or deleted later only by the administrator's settings, and the administrator maintains the administrator authority with the door lock 210 through the door lock management app 221 using the generated administrator password.

For example, the set password may be the initial password to which "1234" is assigned during the manufacturing process, or may be a password that the user is using by replacing the set password "1234" with another random set password. When an administrator password has never been generated using a set password, an administrator password may be generated at any time. However, when a current set password is not identified, an administrator password cannot be generated.

When the door lock is used in a stand-alone use mode rather than the IoT use mode, an administrator password is generated with an administrator authority using a set password assigned when a door lock product is released, the administrator password is generated only once for the first time, and thus a security level can be increased.

The administrator password set in this way is requested to be input when the smart device 220 requests the administrator authority from the door lock 210, and when the input administrator password matches the set administrator password, the administrator authority is granted.

To describe the granting of the administrator authority to the door lock 210 in more detail, the wireless communication module 211 of the door lock 210 checks whether password data transmitted from the smart device 220 matches the administrator password stored in the door lock control module 212, and then grants administrator authority.

In this case, in order to grant the administrator authority to the door lock 210, the administrator password registered using the set password should be input, or the administrator should change the administrator password, which is generated using the set password only once for the first time, by himself/herself to input the administrator password currently registered in the door lock 210.

Further, since the administrator who has been granted the administrator authority is allowed to use only one ID and other users are not allowed, in order to acquire the administrator authority, not only should the door lock 210 not be connected to the door lock management app 221, but the current administrator password assigned to the door lock 210 should also be identified, and thus the security level may be increased.

The administrator who registers the administrator password through this process and acquires the administrator authority may perform pairing on the door lock 210 with the administrator authority, then register his/her administrator authority on the server 230, and may not only set various door lock usage settings, such as resetting the password for the door lock 210 and the like, but also manage data such as battery level information of the door lock, incorrect password entry by other users, entry/exit history, etc.

That is, the administrator sets linking to the door lock 210 with the administrator authority through the door lock management app 221 of his/her smart device 220, and thus the administrator receives various types of status values from the door lock 210, and performs two-way communication for transmitting various types of commands to the door lock 210 and receiving feedback from the door lock 210.

While the setting method in conjunction with the door lock administrator authority according to the embodiment of the present invention has been described with reference to specific embodiments and drawings, the present invention is not limited thereto. It is clear that various modifications and alterations may be made by those skilled in the art without departing from the spirit and scope of the present invention and equivalents of the appended claims.

The invention claimed is:

1. A setting method in conjunction with a door lock administrator authority, which manages a door lock through a door lock management app (application) of a smart device linked to a server, comprising:

a first process of downloading and installing a door lock management app on the smart device through the server;

a second process of performing pairing on the door lock retrieved through a wireless communication method through the door lock management app;

a third process of activating an administrator authority by inputting an administrator password in response to a request for inputting a password of the door lock; and a fourth process of performing pairing on the door lock management app and the door lock with the administrator authority, wherein, in the third process, the door lock administrator authority is an authority of an administrator registered with an identification (ID) and a password on the server, and the administrator authority is acquired only by inputting a preset administrator password in response to a request for inputting the administrator password of the door lock after logging in as a user registered on the server, and an initial administrator password is generated using a set password of the door lock.

2. The setting method of claim 1, wherein the door lock performs short- or long-distance wireless data transmission and pairing with the smart device through a built-in wireless communication module, and a password is reset or door opening/closing control data is generated by the administrator authority through a built-in door lock control module according to data received from the smart device through the wireless communication module.

3. The setting method of claim 1, wherein the set password is a password assigned when a door lock product is released, or a password reset by a user using the password assigned when the door lock product is released, the administrator password is a password generated only once for a first time using the set password, and the generated initial administrator password is allowed to be changed or deleted later only by the administrator's settings, and the server and the door lock are linked only through the administrator password.

4. The setting method of claim 3, wherein the administrator password is allowed to be changed by the administrator, and the changed administrator password is currently registered in the door lock.

5. The setting method of claim 3, wherein the administrator password is input in response to the request for inputting the administrator password of the door lock in order to link with the door lock.

6. The setting method of claim 1, wherein, when the door lock is used in a stand-alone use mode, the administrator password is a password generated using the set password assigned when a door lock product is released, with the administrator authority, and is allowed to be generated only once for a first time.

7. The setting method of claim 1, further comprising, after the fourth process, registering password reset data in the door lock and on the server after acquiring the administrator authority.

* * * * *